Dec. 1, 1931.     J. H. JEPSON     1,834,540
KNEE JOINT FOR ARTIFICIAL LEGS
Filed Aug. 22, 1929
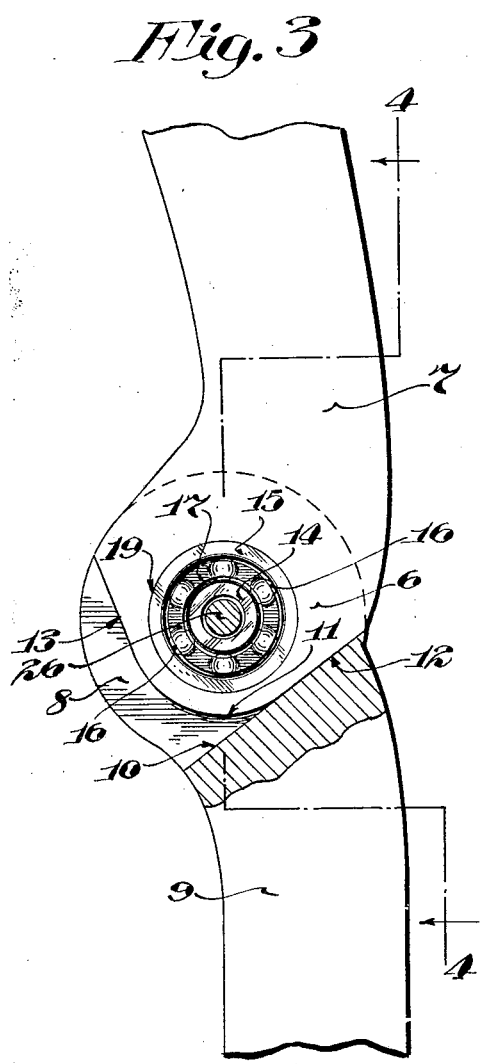
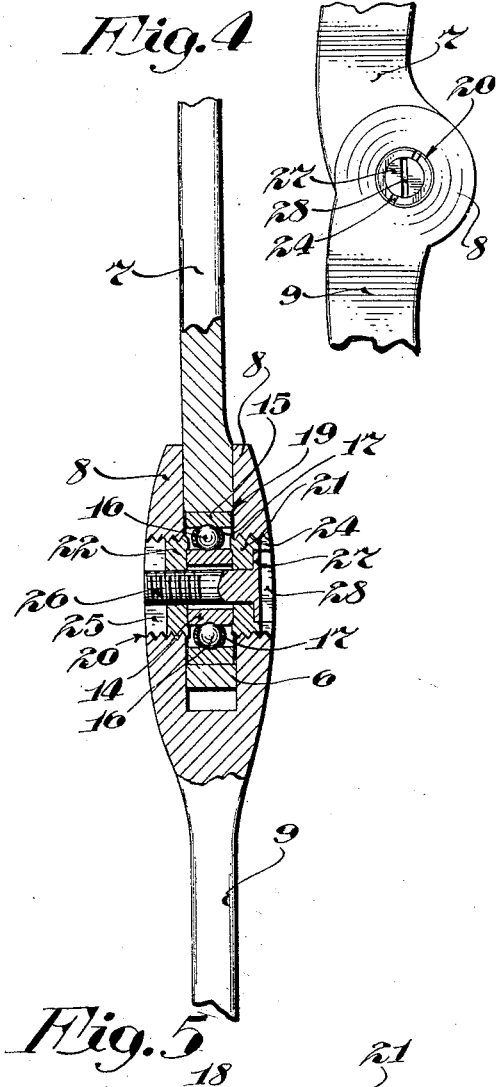
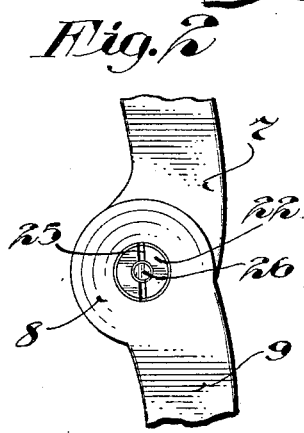
Inventor
John H. Jepson
By his Attorneys
Merchant and Kilgore Patented Dec. 1, 1931

1,834,540

UNITED STATES PATENT OFFICE

JOHN H. JEPSON, OF MINNEAPOLIS, MINNESOTA

KNEE JOINT FOR ARTIFICIAL LEGS

Application filed August 22, 1929. Serial No. 387,680.

My present invention has for its object the provision of a simple and highly efficient ball-bearing joint intended for general use but especially well adapted for use as a knee side joint for artificial leg for an amputation below the knee.

To the above end, generally stated, the invention consists of the novel devices and combination of devices hereinafter described and defined in the claims.

In the accompanying drawings, which illustrate the invention, like characters indicate like parts throughout the several views.

Referring to the drawings:

Fig. 1 is a face view of the knee side joint for an artificial leg, the outer end portions of the straps being broken away.

Fig. 2 is a view corresponding to Fig. 1, but showing the other face of the joint.

Fig. 3 is a view corresponding to Fig. 2, but on an enlarged scale with one of the ears broken away and certain parts sectioned.

Fig. 4 is a view principally in section taken on the irregular line of 4—4 of Fig. 3; and Fig. 5 is a view in section of the two set-screws and inner race removed from the joint and axially separated.

The knee side joint, as shown, includes a hub 6 formed on the lower end of a metal strap 7 and a pair of laterally spaced ears 8 formed on the upper end of a metallic strap 9 and between which ears said hub is mounted. These straps 7 and 9 are provided for securing the joint to the upper and lower sections, respectively, of an artificial leg not shown for an amputation below the knee in the customary or any suitable manner.

On the upper end of the strap 9 between the ears 8 is a downwardly and rearwardly inclined stop surface 10 and the under side of the hub 6 is formed on the arc of a circle as indicated at 11. This surface 11 is out of contact with the stop surface 10 during the movement of either one of the straps 7 and 9 in respect to the other. Front and rear stop surfaces 12 and 13 are formed on the hub 6 for cooperation with the stop surface 10, and extend substantially tangentially in opposite directions from the surface 11. Said stop surface 12 by its engagement with the stop surface 10 limits the forward swinging movement of the lower leg section and positions the upper and lower leg sections to which the joint is applied in proper alignment. The stop surfaces 10 and 13 limit the rearward movement of the upper leg section in respect to the lower leg section.

During the movement of the leg sections in respect to each other there is produced a pounding action between the stop surfaces 10, 12, and 13 at the limit of such movements and it is important to note that the surfaces 12 and 13 are extremely long and thereby retain their shape during the above noted pounding action. There is a close working fit between the hub 6 and ears 8 to prevent lateral or angular movements of the one in the respect to the other.

The members of the knee side joint are connected by a ball-bearing comprising inner and outer races 14 and 15, respectively, and interposed balls 16 carried by a cage 17. By reference to Fig. 5, it will be noted that the opposing faces of the races 14 and 15 have at their transverse centers shallow annular grooves 18 in which the balls 16 travel. This ball-bearing is mounted in an axial passageway 19 in the hub 6 and the outer race 15 is rigidly secured thereto by a pressed fit. It is important to note that the ball-bearing is entirely within the hub 6.

An axial passageway 20 extends transversely through the ears 8 at the axis of the hub 6 and have mounted therein a pair of short axially aligned set-screws 21 and 22 that have threaded engagement with said ears. The inner or opposing ends of the set-screws 21 and 22 impinge against the ends of the inner race 14 which has an axial passageway and rigidly connect the same to the ears 8 for turning movement therewith about the axis of the hub 6. By reference to Figs. 4 and 5, it will be noted that the inner ends of the set-screws 21 and 22 have shallow depressions 23 into which the ends of the inner race 14 extend and thereby center the same in axial alignment with said set-screws.

Formed in the outer ends of the set-screws 21 and 22 are transversely extended grooves 24 and 25, respectively, for the application of a screw driver by which said screws may be turned into or out of the passageway 20. It is important to note that the set-screws 21 and 22 when in operative position are entirely within the ears 8 so that the outer surfaces of said ears are smooth.

A lock-screw 26 is provided for securing the set-screws 21 and 22 in operative positions and prevents the same from being accidentally moved, which would release the inner race 14 held thereby. This lock-screw 26 loosely extends through a bore in the set-screw 21 at the axis thereof and has screw threaded engagement with the set-screw 22 through which it extends axially. Said lock-screw 26 also extends axially through the passageway in the inner race 14 and is radially spaced therefrom throughout its entire circumference. The lock-screw 26 is provided with a large head 27 counter-sunk in the outer end of the screw 21 so that it does not project outward of the respective ear 8. A groove 28 is formed in the head 27 for the application of the screw driver by which the lock screw 26 may be turned. This lock-screw 26 has threaded engagement with the set-screw 22 through which it extends axially and the outer end of the lock-screw 26 is substantially flushed with the outer end of the set-screw 22 and does not project outward of the respective ear 8.

It will be noted in Fig. 4 that the ball-bearing is completely encased within the joint by the hub 6 and ears 8 and the joint therebetween is such that dust or dirt cannot work into the interior of the joint. This encasement of the ball-bearing makes it possible to pack the balls thereof in grease so that the same will always be properly lubricated, and a light oil may be introduced between the contacting faces of the hub 6 and ears 8 to lubricate the same.

To separate the joint, it is only necessary to remove the lock-screw 26 and turn the screw 21 and 22 outward sufficiently to release the inner race 14. With the parts thus adjusted, the hub 6 may be readily removed from between the ears 8 and as the balls 16 are held in the cage 17 and the shallow grooves 18 in the races 14 and 15 so they cannot drop out of the bearing. The parts of the bearing will thus be retained in their assembled relation.

From the above description, it is evident that the entire load on the joint is sustained by the balls 16 thereby producing a free acting joint that gives the lower leg section an easy and natural swinging movement.

What I claim is:

1. A device of the class described comprising a member having a pair of laterally spaced ears and a hub having an axial passageway therebetween, a bearing in the hub including inner and outer races and balls interposed therebetween, said outer race being held for turning movement with the hub, and a pair of axially aligned set-screws having threaded engagement with said ears, impinging against the ends of the inner race and supporting the same for turning movement with the member about the axis of the hub.

2. The structure defined in claim 1 in which the set-screws have means comprising socketed engagement with the inner race for holding the same centered with respect thereto.

3. The structure defined in claim 1 in further combination with a lock-screw extending axially through one of the set-screws, an axial passageway in the inner race and having threaded engagement with the other set-screw.

4. The structure defined in claim 1 in further combination with the lock-screw extending axially through one of the set-screws, an axial passageway in the inner race and having threaded engagement with the other set-screw, said lock-screw being circumferentially spaced from the inner race throughout its entire circumference.

5. A device of the class described comprising a member having a pair of laterally spaced ears and a hub having an axial passageway therebetween, a bearing in the hub including inner and outer races and balls interposed therebetween, said outer race being held for turning movement with the hub, and a set-screw having threaded engagement with one of the ears and axially aligned with the inner race, said set-screw being arranged with its inner end impinging against the adjacent end of the inner race and pressing the inner race axially therefrom with its opposite end in contact with a part on the opposite ear, said set-screw and the part on the other ear holding the inner race from turning with respect thereto.

6. The structure defined in claim 5 in which the set-screw and part on the other ear have means comprising socketed engagement with the ends of the inner race for holding the same centered with respect thereto.

In testimony whereof I affix my signature.

JOHN H. JEPSON.